Patented July 7, 1925.

1,545,394

UNITED STATES PATENT OFFICE.

HAMILTON P. CADY, OF LAWRENCE, KANSAS, ASSIGNOR OF ONE-HALF TO ALBIN M. PAINTER, OF KANSAS CITY, MISSOURI.

STABILIZING CHLORINATED LIME.

No Drawing.   Application filed January 19, 1925. Serial No. 3,502.

*To all whom it may concern:*

Be it known that I, HAMILTON P. CADY, a citizen of the United States, residing at Lawrence, in the county of Douglas and State of Kansas, have invented certain new and useful Improvements in Stabilizing Chlorinated Lime; and I do declare the following to be a full, clear, and exact description of the invention, such as will enable others skilled in the art to which it appertains to make and use the same.

This invention relates to the method of stabilizing chlorinated lime, commonly known as bleaching powder and while the stabilized product may be capable of a multitude of uses it is particularly intended for use in the treatment of colds and the like. The finished product may be placed in a container constructed so that the gases can be inhaled, the container conforming preferably to the common type of inhaler generally used in connection with materials for treating colds and the like. It is understood of course that in so far as the present application is concerned the product is not limited to any particular use.

Chlorinated lime or so called bleaching powder often contains free or uncombined calcium chloride, magnesium chloride or both. Each of these chlorides is a highly deliquescent substance and attracts water from the air rendering the whole mass of bleaching powder or chlorinated lime moist. In this moist condition the chlorinated lime easily decomposes and loses its active chlorine more rapidly than when it is dry. I have found that it is possible to stabilize the chlorinated lime. For example, the addition of an alkali metal carbonate, such as sodium carbonate or potassium carbonate transforms the free uncombined calcium or magnesium chloride into calcium or magnesium carbonate, forming at the same time sodium or potassium chloride depending upon whether sodium or potassium carbonate is used. Since the alkali chlorides are not strongly deliquescent the whole mixture of chlorinated lime and alkali metal carbonate quickly becomes dry and remains so. The mixture may be effected in a convenient manner and after the mixture is made the resultant product may be granulated by subjecting it to pressure with or without the addition of any other substance, then breaking it up mechanically into properly sized fragments. In some cases I may use the resultant product in larger lumps or by forming it into larger shape than the size generally considered granular.

The quantity of alkali metal carbonate to be added to any fixed quantity of chlorinated lime will naturally depend upon the per cent of free or uncombined calcium chloride or magnesium chloride or both which may be present. I recommend that the amount of alkali metal carbonate should be in excess of the amount necessary to transform the chlorides into the corresponding carbonates although a smaller amount of alkali metal carbonate would be helpful in retarding the too rapid volatilizing of the chloride gases. As an example I recommend about 20 pounds of sodium carbonate to each 50 pounds of chlorinated lime to which may be added about 15 parts of water. The solids may be mixed dry and the water added and if desired the whole may be compacted by pressure and allowed to dry. The chlorinated lime, may if desired, be granulated by subjecting it to pressure without the addition of any other substance and then breaking it up properly into fragments. I have also found that the addition of a small amount of petroleum oil to chlorinated lime after the addition of an alkaline metal carbonate increases the stability of the product.

From the foregoing it will be apparent that the chlorine is not actually fixed but that the chlorine gases will be stabilized so that they will evolve at a low rate without danger of the chlorine gases volatilizing quickly even at relatively high temperatures. The product is particularly efficacious in the treatment of bronchial affections and the like and while my invention is especially designed to provide a product which will be commercial for the treatment of colds and the like I do not wish to be limited to this particular use.

What I claim and desire to secure by Letters-Patent is:—

1. The method of stabilizing chlorinated lime which consists in adding thereto an alkali metal carbonate.

2. The method of stabilizing chlorinated lime containing chlorides which consists in adding thereto an alkali metal carbonate in proportion to the amount of chloride present.

3. The method of stabilizing chlorinated lime containing chlorides which consists in transforming the chlorides into carbonates.

4. A chemical product consisting of chlorinated lime and an alkali.

5. A chemical product consisting of chlorinated lime and a stabilizing medium.

6. A chemical product consisting of chlorinated lime and an alkali metal carbonate.

7. A chemical product consisting of chlorinated lime and an alkali and petroleum oil.

In testimony whereof I affix my signature.

HAMILTON P. CADY.